E. EISENBRAUN.
ATTACHMENT FOR POST HOLE AUGERS.
APPLICATION FILED MAR. 27, 1908.

939,235.

Patented Nov. 9, 1909.

Witnesses

Inventor
Emanuel Eisenbraun
By Chandler & Chandler
Attorneys

UNITED STATES PATENT OFFICE.

EMANUEL EISENBRAUN, OF TRIPP, SOUTH DAKOTA.

ATTACHMENT FOR POST-HOLE AUGERS.

939,235.   Specification of Letters Patent.   Patented Nov. 9, 1909.

Application filed March 27, 1908. Serial No. 423,602.

*To all whom it may concern:*

Be it known that I, EMANUEL EISENBRAUN, a citizen of the United States, residing at Tripp, in the county of Hutchinson, State of South Dakota, have invented certain new and useful Improvements in Attachments for Post-Hole Augers; and I do hereby declare the following to be a full, clear, and exact description of the invention, such as will enable others skilled in the art to which it appertains to make and use the same.

My invention relates to an improvement in post hole augers and has for one of its objects to provide an improved means for attaching auxiliary cutting blades to the cutting blades of implements of this character.

Another object of the invention is to provide an attachment for earth augers, so constructed and arranged that a number of different sized holes may be excavated with one implement instead of employing a different sized auger for each hole.

Another object of the invention is to provide an attachment which, while it will be very strong and durable, will be easy to attach to the augers now in use and can also be manufactured very cheaply.

With the above and other objects in view, a more complete and detailed description will be set forth hereinafter with reference to the drawings which form a part of this specification.

Figure 1:
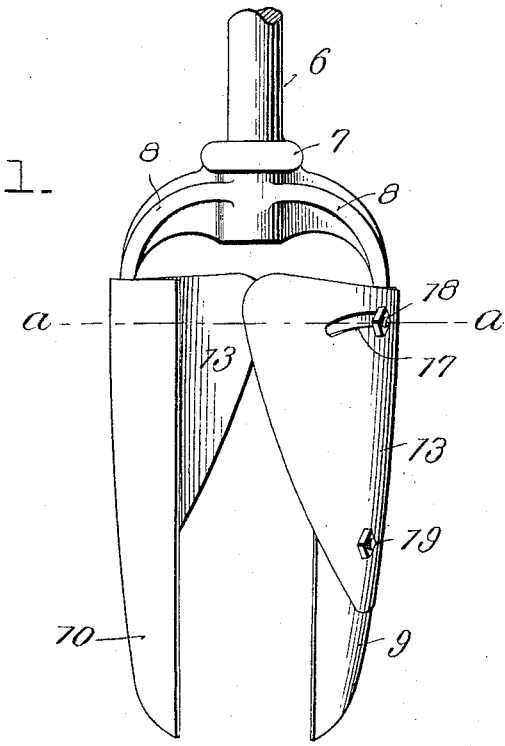
Figure 2:
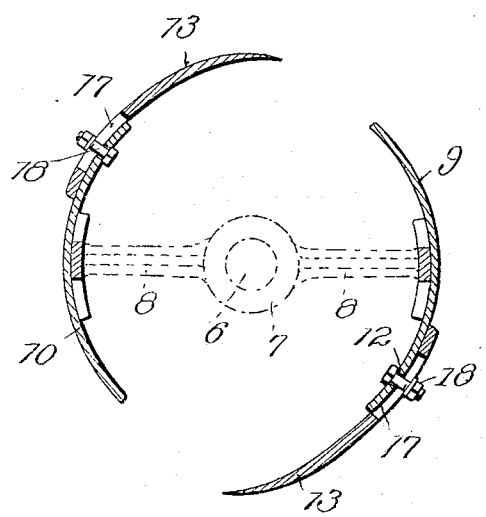
Figure 3:
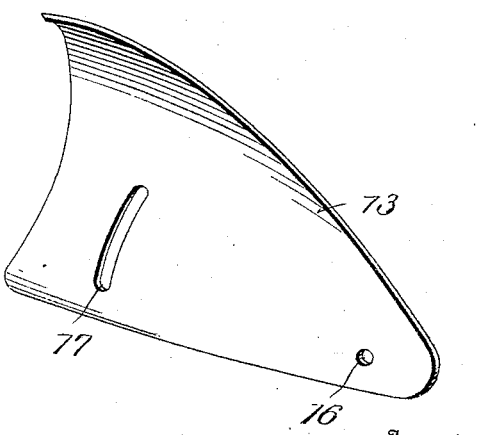

Figure 1 is a side elevation of my invention attached to a post hole auger of ordinary construction. Fig. 2 is a sectional view enlarged taken on the line *a—a* of Fig. 1. Fig. 3 is a detailed perspective view of my attachment removed from the auger.

Referring to the drawings, in which like parts are indicated by like numerals, the numeral 6 designates the handle of the auger. Secured to the lower end of said handle is a collar 7 which is provided with two arms extending laterally outwardly and downwardly, as indicated by the numeral 8. Fastened to the lower end of the arms 8, are the two cutting blades 9 and 10, which are similar to those with which the earth augers are now provided.

The numeral 13 designates the auxiliary cutting blade and as both are identical in construction, only one will be described.

The auxiliary cutting blade comprises a metallic plate tapered longitudinally and of substantially inverted triangle shape, said blade having one of its edges sharpened and bent adjacent thereto. The above mentioned blade, 13, is provided with a pivot bearing 16 adjacent to its lower end, while adjacent to its upper end it is provided with an arc-shape slot 17, said slot running transversely of said blade. It will be seen that the slot 17 is curved in the arc of a circle with the pivot bearing 16 taken as a center point.

In securing my attachment to the auger blade, I place the auxiliary cutting blade 13 on the blade 9 of the auger, and pass a pivot bolt 19 through the orifice of the blade 9 and through the pivot bearing 16 of the blade 13, and fasten it by a nut. A clamping bolt 18 is passed through a bolt orifice 12 of the blade 9 and through the arc-shaped slot 17 in the blade 13.

From the above description it will be seen that whenever it is desired to adjust the auger it will only be necessary to loosen the bolt 18 and slide the auxiliary blade either way it is desired. By having the blade 13 rotatably secured by the pivot bolt 19 and having it provided with the arc-shaped slot 17 it will be seen that no matter how it may be adjusted the blade will always present its full cutting edge.

What is claimed is:

The combination with a post auger comprising two main segmental cutting blades tapering toward their lower ends, of auxiliary segmental cutting blades tapering toward their lower ends, means for connecting said auxiliary blades at their lower smaller ends to swing upon said main blades intermediate the ends thereof, and means for adjustably connecting said auxiliary blades at their upper ends to said main blades, whereby the cutting edges of said auxiliary blades extend obliquely across the cutting edges of the main blades.

In testimony whereof, I affix my signature, in presence of two witnesses.

EMANUEL EISENBRAUN.

Witnesses:
L. F. KLIEBENSTEIN,
ROY H. WOLFF.